United States Patent
Gallo et al.

(10) Patent No.: US 8,498,617 B2
(45) Date of Patent: Jul. 30, 2013

(54) METHOD FOR ENROLLING A USER TERMINAL IN A WIRELESS LOCAL AREA NETWORK

(75) Inventors: Paolo Gallo, Turin (IT); Marco Polano, Turin (IT); Pietro Obino, Turin (IT)

(73) Assignee: Telecom Italia S.p.A., Milan (IT)

( * ) Notice: Subject to any disclaimer, the term of this patent is extended or adjusted under 35 U.S.C. 154(b) by 1121 days.

(21) Appl. No.: 11/660,384

(22) PCT Filed: Aug. 20, 2004

(86) PCT No.: PCT/EP2004/051875
§ 371 (c)(1),
(2), (4) Date: Feb. 16, 2007

(87) PCT Pub. No.: WO2006/018047
PCT Pub. Date: Feb. 23, 2006

(65) Prior Publication Data
US 2007/0263577 A1 Nov. 15, 2007

(51) Int. Cl.
*H04M 1/66* (2006.01)
*H04M 1/00* (2006.01)
*H04B 1/38* (2006.01)
*G06F 15/16* (2006.01)

(52) U.S. Cl.
USPC ........ 455/411; 455/410; 455/550.1; 455/561; 709/227; 709/228; 709/229; 709/208; 709/209

(58) Field of Classification Search
USPC ................. 455/410–411, 550.1, 561; 726/3; 709/208–211, 220–222, 227–229, 248
See application file for complete search history.

(56) References Cited

U.S. PATENT DOCUMENTS

| | | | |
|---|---|---|---|
| 7,277,547 B1 * | 10/2007 | Delker et al. | 380/270 |
| 2001/0002486 A1 * | 5/2001 | Kocher et al. | 713/171 |
| 2002/0061748 A1 * | 5/2002 | Nakakita et al. | 455/435 |
| 2003/0126243 A1 * | 7/2003 | Kudo et al. | 709/222 |
| 2004/0023642 A1 * | 2/2004 | Tezuka | 455/411 |
| 2004/0076300 A1 * | 4/2004 | Ishidoshiro | 380/277 |

FOREIGN PATENT DOCUMENTS

| | | |
|---|---|---|
| EP | 1 178 644 A2 | 2/2002 |
| EP | 1 414 214 A2 | 4/2004 |
| KR | 2002-0032082 * | 5/2002 |

OTHER PUBLICATIONS

Bluetooth™ Security White Paper Bluetooth SIG Security Expert Group, pp. 1-43. (2002).
B. Aboba et al.; "PPP EAP TLS Authentication Protocol", Network Working Group, Requests for Comments: 2716, Category: Experimental, pp. 1-22, (1999).

(Continued)

*Primary Examiner* — Jean Gelin
*Assistant Examiner* — Dung Hong
(74) *Attorney, Agent, or Firm* — Finnegan, Henderson, Farabow, Garrett & Dunner, L.L.P.

(57) ABSTRACT

A method for enrolling a user terminal in a network includes an access point for the user terminal, the access point performing the following steps: detecting the performance of a first pressure of a registration button on the access point; detecting the reception of a request for enrollment from the user terminal; detecting the performance of a second pressure of the registration button on the access point; and enrolling the user terminal in the network only if a single request for enrollment is received between the detections of the first and second pressures.

29 Claims, 4 Drawing Sheets

OTHER PUBLICATIONS

T. Dierks et al.; "The TLS Protocol Version 1.0", Network Working Group, Request for Comments: 2246, Category: Standards Track, pp. 1-72, (1999).

B. Schneier; "Applied Cryptography, Second Edition: Protocols, Algorithms, and Source Code in C (cloth)", 1996, John Wiley & Sons, Inc., ISBN: 0471128457, Chapter 22, 15 pages, (1996).

* cited by examiner

METHOD FOR ENROLLING A USER TERMINAL IN A WIRELESS LOCAL AREA NETWORK

CROSS REFERENCE TO RELATED APPLICATION

This application is a national phase application based on PCT/EP2004/051875, filed Aug. 20, 2004.

TECHNICAL FIELD OF THE INVENTION

The present invention relates in general to networks, and in particular to a method for enrolling a user terminal in a local area network (LAN), in particular a wireless LAN (WLAN) adapted to be used in domestic, small office or home office (SOHO) environments.

BACKGROUND ART

Access points as radio relay stations for a wireless LAN are used as the device for connecting multiple computers at separate locations to, e.g., the Internet or, in general, to a Wide Area Network (WAN). Access points may be adapted to give authorization for access to the Internet via the wireless LAN only to a limited number of people (for example clients). In such cases, it is required to prevent illegal access of any unauthorized person to the network. Moreover, for a sufficient protection of the privacy of each person, it is essential to effectively prevent the contents of communication between the computers from being leaked to any third person by interception of the radio waves in the radio communication area associated to the access point.

Diverse security techniques for preventing illegal access to the network and leakage of communication to any third person have been proposed with regard to the wireless LAN: one proposed technique utilizes a MAC (Media Access Control) address, which is an intrinsic identification number allocated to a device for connecting the wireless LAN (for example, a wireless LAN adapter) attached to the terminal, and registers the allocated MAC address in the access point. The access point authenticates the MAC address in response to an access from the terminal, and rejects the request of access to the network from the terminal when the input MAC address is not identical with the registered MAC address.

Another proposed technique sets a WEP (Wired Equivalent Privacy) key as a common encryption key in both the terminal and the access point and encrypts the details of the data, which are transmitted between the terminal and the access point, with the WEP key. Even in the case of accidental leakage of data, the encryption makes it difficult to analyse and grasp the data.

The prior art security technique, however, requires manual registration of the MAC address in the access point and manual setting of the WEP key in the terminal. This is rather troublesome and inconvenient in the case of new enrollment of a terminal for the wireless LAN.

A WEP key of an arbitrary letter string set in the terminal should also be set in the access point. It would be preferable to utilize the wireless LAN for the setting. In this scenario, the WEP key data carried on the radio wave is transmitted from the terminal to the access point by wireless. The access point receives the transmitted WEP key and sets the WEP key mapped to the terminal. The user of the terminal is then allowed to enjoy various services (for example, Internet access service) via the wireless LAN immediately after transmission of the WEP key. In the case of wireless transmission of the WEP key, however, there is a possibility of leakage of the WEP key to a third person through interception of the radio wave transmitted between the terminal and the access point. The third person who illegally obtains the leaked WEP key can analyse and grasp all the data transmitted between the access point and the terminal with the WEP key. This disables the security system based on encryption.

US 2004/0076300 discloses a method and an arrangement which allows for a new enrollment of a terminal for a WLAN, while preventing leakage of data representing an encryption key, wherein in response to the pressure of a registration button, an access point restrict the coverage of radio wave transmitted from the access point from a general radio communication area to a narrower security communication area. The access point subsequently delivers a Wired Equivalent Privacy (WEP) key to a terminal, confirms the successful delivery, and registers a Media Access Control (MAC) address of the terminal, which sets the delivered WEP key in it.

Additionally, US 2004/0023642 discloses a wireless access point for connecting a wireless LAN and a wired LAN together comprising a central control unit able to read a bridge control program, an IEEE 802.1x control program and an authentication control program into a memory, to execute them. Based upon the IEEE 802.1x control program and the authentication control program, the central control unit authenticates a wireless terminal on a wireless LAN in response to a request for access to a network on a wired LAN from the wireless terminal on the wireless LAN, and notifies a common key of WEP to the wireless terminal on the wireless LAN when the authentication is obtained. A certificate issue program is further stored in the wireless access point. In fact, when an EAP-TLS system which is one of the authentication system, is used, a certificate issue server function is necessary for issuing a valid certificate for authenticating the client. The central control unit reads the certificate issue program to execute it. Based on the certificate issue program, the central control unit forms a certificate for the client in the wireless access point. The certificate for the client that is formed is sent to, for example, an IC card reading/writing device on the reliable network on the wired LAN through a wireless LAN interface unit. The IC card reading/writing device prepares an IC card recording the certificate for the client for the predetermined wireless terminal. In the network system equipped with this wireless access point a wireless terminal on the wireless LAN can be authenticated at the wireless access point eliminating the need of providing the authentication server and the certificate issue server on the wired LAN. In this way a packet for authentication exchanged among the wireless access point, the authentication server and the certificate issue server is prevented from flowing on the wireless LAN and therefore from being eavesdropped.

Furthermore, the Bluetooth® Security White Paper (which can be downloaded, as of the filing date of the present specification, from the Internet at the Bluetooth® website from a file entitled "24Security Paper.PDF) discloses a procedure to set up a trusted connection between two terminals controlled by the same user and initially unknown, wherein the procedure is based on the performance of a physical action on the two terminals by the user, and on the user's knowledge of a secret key stored in one of the two terminals. Authentication is performed by asking the user to type the secret key in the other terminal.

The Applicant has observed that, this procedure firstly implements an authentication protocol which is based on a shared secret keys and therefore can suffer from the problem of weakness against so-called "vocabulary" attacks, and secondly requires that the user remember and types a secret key for each of the terminals to be authenticated.

OBJECT AND SUMMARY OF THE INVENTION

The aim of the present invention is to simplify the enrollment procedure for a new user terminal in a wireless LAN, adapted to be used in domestic or SOHO environments, while preventing illegal accesses to the wireless LAN.

This aim is achieved by the present invention by a method for enrolling a user terminal (UT) in a network (WLAN) including an access point (AP) for the user terminal (UT), characterized by:
  detecting the performance of a first action by a user which proves that the user may directly interact with the access point (AP);
  detecting the reception of a request for enrollment from the user terminal (UT);
  detecting a performance of a second action by the user which proves that the user may directly interact with the access point (AP); and
  enrolling the user terminal (UT) in the network (WLAN) only if a single request for enrollment is received between the detections of the performance of the first and second actions.

The method of the present invention further includes:
  refusing the enrollment of the user terminal (UT) if more than one request for enrollment is received between the detections of the performance of the first and second actions.

In preferred embodiments detecting performance of a first action and a second action by the user may include:
  detecting the performance of a first action and a second action by the user physically on the access point (AP); or
  detecting performance of a first action and a second action by the user physically on the access point (AP) may include:
  detecting a first operation and a second operation of a registration button on the access point (AP); or
  detecting performance of a first action and a second action by the user physically on the access point (AP) may include:
  detecting a first operation and a second operation of an access point configuration interface on the access point (AP); or
  detecting the reception of a request for enrollment from the user terminal (UT) may include:
  detecting the reception of a request for enrollment access credentials, wherein enrolling the user terminal (UT) in the network (WLAN) may include:
  upon detecting the performance of the second action by the user, generating and sending to the user terminal (UT) the enrollment access credentials,
  wherein the enrollment access credentials may include an enrollment digital certificate (DC), or
  wherein generating and sending to the user terminal (UT) the enrollment digital certificate (DC) may include:
  detecting the reception of an identifier (ID) of either the user or the user terminal (UT), and of a public key (KWNU_pub) randomly generated by the user terminal (UT);
  upon detecting the performance of the second action by the user, generating the enrollment digital certificate (DC) on the basis of the received identifier (ID) and the public key (KWNU_pub);
  signing the enrollment digital certificate (DC) with a private key of the access point (AP); and
  sending the signed enrollment digital certificate (DC) to the user terminal (UT).

In other preferred embodiments, the enrollment access credentials may include an enrollment secret key/password,
  wherein generating and sending to the user terminal (UT) the enrollment secret key/password may include:
  agreeing a symmetric key (KS) between the user terminal (UT) and the access point (AP);
  establishing a communication channel between the user terminal (UT) and the access point (AP), any communication over said channel being encrypted by the agreed symmetric key (KS);
  detecting the reception of an identifier (ID) of either the user or the user terminal, said identifier (ID) being sent over the encrypted communication channel;
  upon detecting the performance of the second action by the user, randomly generating the enrollment secret key/password;
  associating the enrollment secret key/password with the received identifier (ID); and
  sending the enrollment secret key/password to the user terminal (UT) via the encrypted communication channel.

In still another preferred embodiments of the present invention, enrolling the user terminal (UT) in the network (WLAN) may include:
  upon detecting the performance of the second action by the user, storing the enrollment access credentials.

The method of the present invention may further include:
  implementing an authentication protocol during the communications for the enrollment of the user terminal (UT) between the user terminal (UT) and the access point (AP),
  wherein implementing an authentication protocol may include:
  upon detecting the performance of the first action by the user, detecting the reception of authentication access credentials from the user terminal (UT);
  verifying the authentication access credentials; and
  in case of positive verification, allowing the user terminal (UT) to have temporary access to the access point (AP) to perform the enrollment, or
  wherein the authentication access credentials may include an authentication digital certificate (New Terminal), or
  wherein the authentication digital certificate (New Terminal) may be issued by a first certification authority (CA2); wherein each access point (AP) may be provided with a unique digital certificate (DC) issued by a second certification authority (CA1); and wherein the first certification authority (CA2) may be provided with a unique digital certificate (DC) issued by the second certification authority (CA1), or
  wherein the authentication access credentials may include an authentication secret key/password.

In the method of the present invention, the network may be a local area network (LAN),
  wherein the network may be a wireless local area network (WLAN), or
  wherein the wireless local area network (WLAN) may be adapted to use in a domestic environment, or
  wherein the wireless local area network (WLAN) may be adapted to use SOHO environments.

The aim of the present invention is also achieved by providing an access point (AP) for a network (WLAN), characterized in that it is configured to implement the enrolling method discussed above; or by providing a user terminal (UT), characterized in that it is configured to connect to, and to cooperate with the above access point (AP) to implement the enrolling method according to the method discussed above; or by providing a network (WLAN), characterized in that it includes the above access point (AP), wherein the network may be a local area network (LAN), or a wireless local area network (WLAN).

The above network may be adapted for use in a domestic environment or the network may be adapted for use in SOHO environments.

It is also an aim of the present invention to achieve software modules able, when loaded in a user terminal (UT) and in an access point (AP) for a network (WLAN), to cooperate in implementing the method discussed above.

Specifically, the present invention allows for the enrollment procedure to be simplified in a domestic or SOHO environment, by automatically providing the user, who wants to enroll his/her own terminal in the wireless LAN, with access credentials to the wireless LAN, after verifying that such user is able to directly interact with the access point. The access credentials can be for example in the form of digital certificates or keys/passwords.

For the purpose of the present invention, by the expression "directly interact", it is to be intended that the user is able to physically interact with the access point for example by the pressure of a registration button or by the access to an access point graphic configuration interface through for example a safe network port.

More specifically, in response to a direct action performed by the user on the access point (e.g., the pressure of a registration button or the access to an access point graphic configuration interface), the access point allows for the new user terminal to gain temporary access to the wireless LAN, limited to the enrollment only and, in response to a request for access to the wireless LAN from the user terminal and to another direct action performed by the user on the access point (e.g., pressure of a registration button or the access to an access point graphic configuration interface), the access point further provides the new user terminal, through the wireless LAN itself, with the requested access credentials.

Thanks to the fact that the access credentials are provided to each new user terminal through the wireless LAN itself, the enrollment procedure above described can also be used with user terminal which are not provided with other communication channels other than the wireless LAN, such as for example an Ethernet network, a USB port, a IR port or a removable medium reader.

BRIEF DESCRIPTION OF THE DRAWINGS

For a better understanding of the present invention, a preferred embodiment, which is intended purely by way of example and is not to be construed as limiting, will now be described with reference to the attached drawings, wherein.

DETAILED DESCRIPTION OF PREFERRED EMBODIMENTS OF THE INVENTION

The following description sets forth different implementation-specific details of a method for enrolling a user terminal in a wireless LAN (WLAN), in particular a WLAN adapted to be used in domestic or SOHO environments. These details are provided in order to illustrate a preferred embodiment of the invention, and not to limit the scope of the invention.

Figure 1:
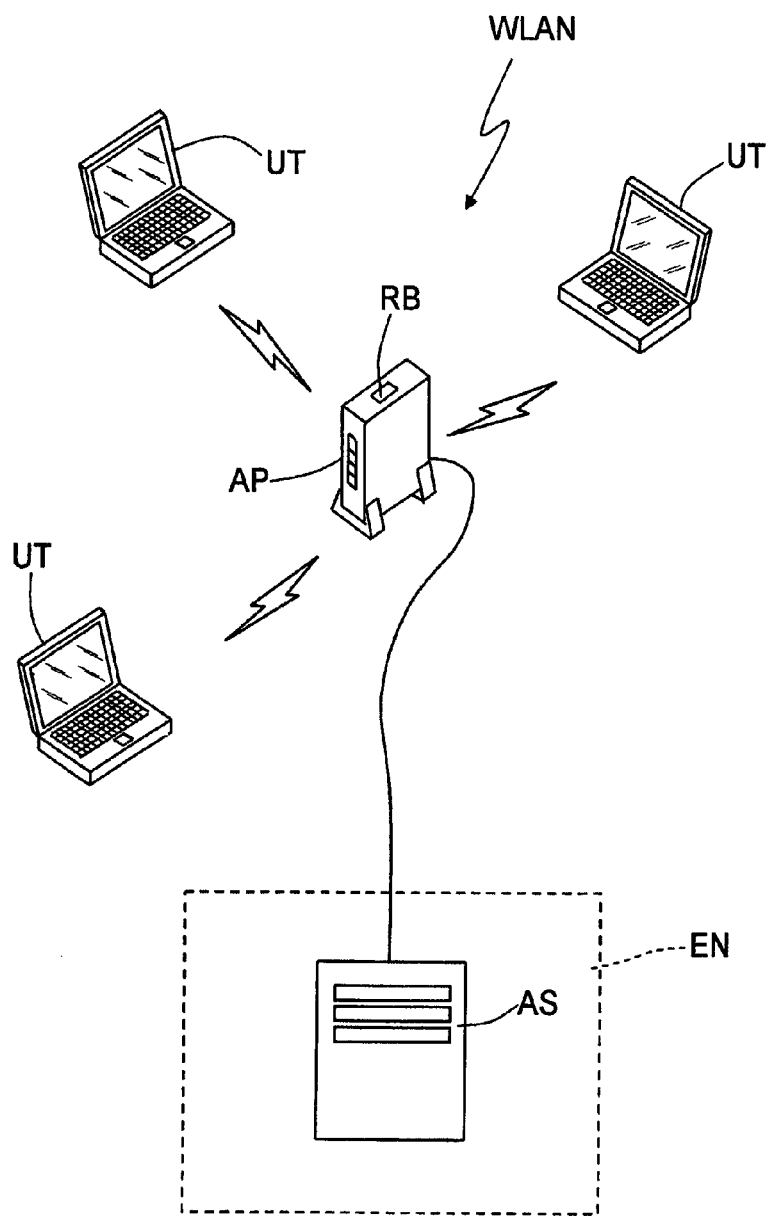
FIG. 1 shows schematically a wireless local area network.

FIG. 1 schematically shows a WLAN, for example a IEEE 802.11 WLAN adapted to be used in domestic or SOHO environments, wherein user terminals UTs (such as for example PCs, PDAs, Wi-Fi phones, smart-phones, etc.) are wireless connected to one (as shown in FIG. 1) or more access points APs. Each access point AP can be connected to an Ethernet network EN including an authentication server AS.

In one embodiment of the present invention, the authentication server AS implements an EAP/TLS (Extensible Authentication Protocol/Transport Layer Security) authentication protocol as described, for example, in the Request for Comments (RFC) 2716 of IETF (which can be downloaded, as of the filing date of the present specification, from the Internet at the IETF website from a file entitled "rfc2716.txt".

In particular, the EAP/TLS authentication protocol requires that a UT that wants to gain access to the WLAN, be provided with digital certificates DCs issued by a Certification Authority (CA), which is an entity managed by a network administrator. Specifically, the arrangement described in the following is based on a preferred hierarchy for the DCs to be issued for the enrollment of new UTs, and on the interaction between a software procedure running on the AP (which implements the EAP/TLS authentication protocol and performs the function of the CA) and a software procedure running on the UTs to be enrolled, to provide them with a respective requested DCs. Further, this arrangement is based on the use of the same WLAN for providing a new UT that wants to gain access to the WLAN with the requested DC, and on some actions performed by the user (which is the owner of the new UT) on the AP, for allowing the AP to verify the identity of the new UT.

Figure 2:
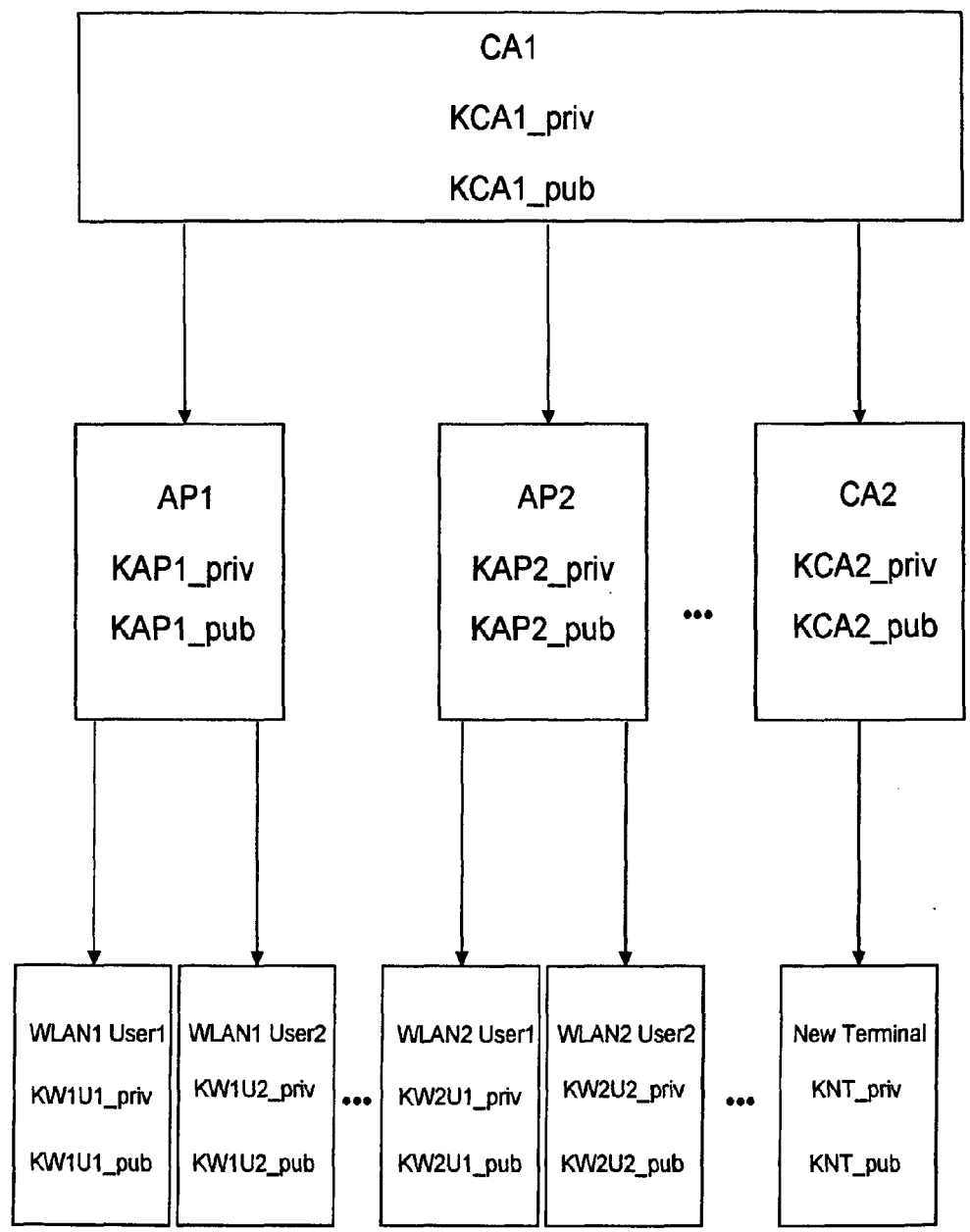
FIG. 2 shown a hierarchy of digital certificates.

FIG. 2 shows the preferred hierarchy for the DCs. Each DC associates an identity with a specific public key, and the corresponding private key is exclusively in possession of the owner of the DC. A main CA, hereinafter referred to as CA1 has a respective pair of asymmetric keys (KCA1_priv, KCA1_pub) and is managed by the manufacturer of the APs. The CA1 issues a different digital certificate (AP1, AP2, . . . ) for each AP of the AP manufacturer. Each certificate (AP1, AP2, . . . ) is signed with the CA1 private key (KCA1_priv). Further, each AP has a respective pair of asymmetric keys (KAP1_priv, KAP1_pub; KAP2_priv, KAP2_pub, . . . ) and is able to issue a DC (WLAN1 User1, WLAN1 User2, WLAN2 User1, WLAN2 User2, . . . ) to each UT enrolled in the WLAN including the AP. Each certificate (WLAN1 User1, WLAN1 User2, WLAN2 User1, WLAN2 User2, . . . ) is signed with the AP private key (KAP1_priv, KAP2_priv, . . . ). Each signed DC is used by the UT, during the authentication procedure towards the AP, to gain access to the WLAN including the AP. The AP manufacturer can also manage a further CA, hereinafter referred to as CA2, whose digital certificate is issued by CA1. CA2 has a respective pair of asymmetric keys (KCA2_priv, KCA2_pub) and is used by the AP manufacturer to issue a new DC (New Terminal) for enabling a new UT to have access to an AP. The new DC (New Terminal) is signed with the CA2 private key (KCA2_priv). The new DC (New Terminal) and the asymmetric keys KWNU_priv and KWNU_pub associated to it are then made publicly available.

Figure 3:
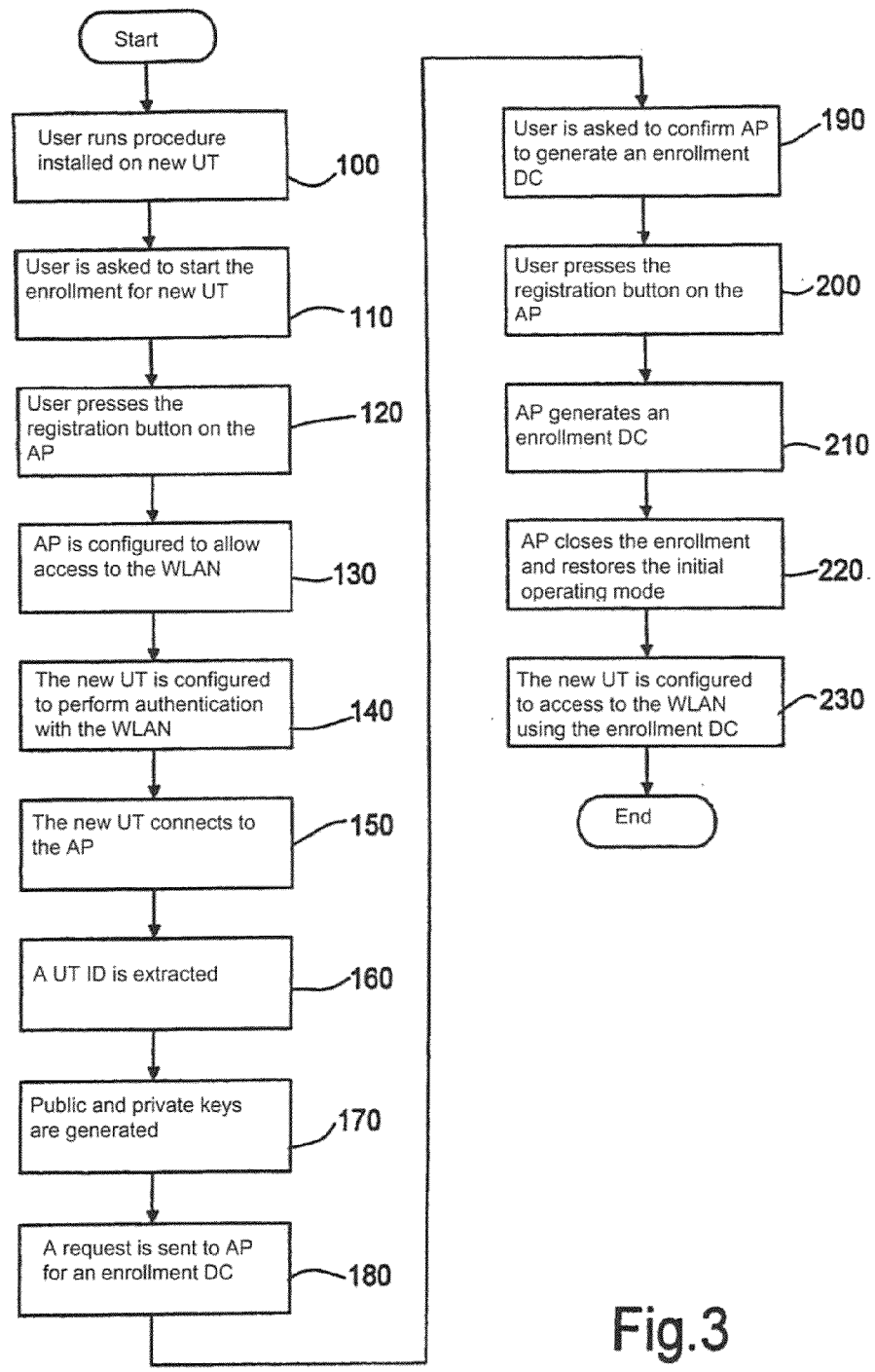
FIG. 3 shows a flow chart of the enrollment method according to a first embodiment of the present invention.

The authentication procedure and the issuance of new DCs are described hereinafter with reference to a generic AP which owns a DC signed by CA1. In standard conditions, the WLAN including the AP provides access only to UTs (each with own private $KW_xU_y\_priv$ and public $KW_xU_y\_pub$ key, with x and y=1, 2, . . . ) having a DC issued by the AP itself. According to one embodiment of the present invention, when a new UT requests to be enrolled in the WLAN through the AP, the following enrollment procedure is carried out (see FIG. 3):

the owner of the new UT ("user") runs a software guided procedure installed on the new UT, the program code of which is provided with an authentication DC (New terminal) issued by the CA2, the DC of the CA2 issued by CA1 and the DC of the CA1, the latter being used to verify the AP identity (block 100);

the guided procedure asks the user to start the enrollment for the new UT by pressing a registration button (RB, FIG. 1) located on the AP (block 110);

the user presses the RB on the AP (block 120);

the AP control software configures the AP so as to allow access to the WLAN also to the UTs in possession of an authentication DC (New Terminal) signed by CA2 (block 130). This operation may be performed by the AP control software by modifying the configuration of that part of the control software implementing the EAP/TLS authentication protocol. In particular, this part of the control software can be modified by adding the authentication DC (New terminal) issued by CA2, to the group of certificates of the trusted CAs. For example, the authentication DC (New Terminal) may be stored in a file of the AP file system;

the guided procedure asks the user to confirm prosecution, for example by clicking on a soft-button, and upon detecting the confirmation, the guided procedure configures the new UT to perform the authentication with the WLAN by using the authentication DC (New Terminal) issued by the CA2 (block 140). In particular, the guided procedure configures the new UT in such a manner that it may only connect to APs provided with DCs signed with the CA1 private key (KCA1_priv). The way these operations are performed depends on the hardware and software architecture of the UT, but it is well known to the skilled persons and will not therefore described hereinafter. The certificate and the asymmetric keys to be used during authentication and the certificate necessary to verify the identity of the AP can in fact be dealt with as configuration parameters in any implementation of the EAP/TLS authentication protocol. In a possible embodiment, the EAP/TLS authentication protocol may be supported by the operating system of the UT and the configuration procedure may exploit some Application Program Interfaces (APIs) of the operating system, to configure the asymmetric keys and the digital certificates of the EAP/TLS.

the new UT connects to the AP (block 150);

the guided procedure asks the user, or automatically extracts, an identifier ID such as an UT identifier (for example the MAC address or the network identifier) and/or a user identifier (for example the username) (block 160). Alternatively, the user may be requested to type a string of characters which identifies the user or the UT.

the guided procedure randomly generates a pair of asymmetric public/private encryption keys KWNU_priv and KWNU_pub (block 170 and FIG. 2);

the guided procedure sends to the AP a request for an enrollment DC, which is needed by the latter to subsequently gain access to the WLAN, together with the (the user identifier or the UT identifier), and the public key KWNU_pub. The AP uses the identifier ID and the public key KWNU_pub for generating the enrollment DC (blocco 180);

the guided procedure asks the user to confirm the AP that an enrollment DC is to be generated by pressing the RB on the AP (block 190);

the user presses the RB on the AP (block 200);

the AP generates an enrollment DC by using the data received with the request for the enrollment DC, signs the enrollment DC with its own private key KAP_priv, and sends it to the UT (block 210);

the AP closes the enrollment procedure and restores the initial operating mode according to which only UTs in possession of DCs signed with the AP private key KAP_priv are allowed to gain access to the WLAN (block 220); and upon receiving the enrollment DC, the guided procedure stores it and then configures the new UT to gain access to the WLAN by using the enrollment DC (block 230). The procedure for the configuration of the new UT is substantially similar to that carried out by the guided procedure to configure the UT for the authentication with the WLAN, and will not therefore be described again.

The above described enrollment procedure is safe for the following reasons.

Even if the DC issued by CA2 and the respective pair of asymmetric keys are available to anyone, they may be used to gain access to the WLAN only within the limited span of time during which the user has activated the enrollment procedure.

The AP is able to discriminate UTs which authenticate by using a DCs issued by CA1 from those which authenticate by using a DC issued by CA2, and may control the network activity for the latter, for example by allowing only data necessary to the issuance of the DCs to be exchanged but not the browsing of the Internet or the connection to network terminals other than the AP.

Authentication carried out through DCs (also that issued by CA2) generates encryption keys to be used at the link level (level 2 of the Open Standards Interconnect (OSI) stack), for example WEP keys, which guarantee an acceptable safety level for the messages exchanged during the procedure for providing a new UT with a DC.

Since all the DCs of the APs are signed by CA1, the guided procedure is able to recognize the AP to which a new DC it is requested. The guided procedure is also able to verify if this AP is that to which the user wants to be connected. In view of this, the risk of an attack of the type "man in the middle" during the enrollment procedure may be avoided.

Theoretically, during the procedure for enrolling a new UT, an hacker having a UT and a DC issued by CA2 could gain access to the AP, and obtain a DC which would allow him/her to gain access to the WLAN, also by means of the new UT under enrollment.

In order to minimize this risk the following precautions can be taken:

the guided procedure asks the user to press the registration button on the AP to confirm the issuance of the DC, only if reception of the request for a DC has been acknowledged by the AP. The acknowledgment may be based on network protocols with acknowledgement, such as Transmission Control Protocol (TCP) or on a specific protocol (for example the http).

upon pressing the registration button on AP, the latter signs and issues the DC only if a single UT has authenticated by using the DC issued by CA2 and if the AP has received only a single request for a new DC.

in every moment the user may verify, through the AP configuration interface, the number of issued DCs and the user/UT identifier associated with each one of them.

If the user does not recognize an identifier, he may disable the owner of the DC associated therewith to have access to the WLAN.

It is possible to exploit the above described enrollment procedure based on the pressure of a registration button by a user also to configure a safety protocol other than the EAP/TLS authentication protocol. Hereinafter there will be described a procedure for the transmission from the AP to a new UT of a generic key/password to encrypt the subsequent communications on the WLAN (e.g., a WEP key or a Pre-Shared Key (PSK) to carry out encryption according to the Wi-Fi Protected Access (WPA) specification of the Wi-Fi Alliance.

Usually, the AP is configured to provide access to the WLAN only to UTs in possession of a key/password previously assigned thereto. When the owner of the AP wishes to allow a new UT to have access to the WLAN, the user carries out the enrollment procedure shown in FIG. 4, which is similar to that previously described with reference to FIG. 3. In particular:

- the user runs a software guided procedure installed on the new UT, the program code of which is provided with an authentication key/password Kw1 for the WLAN (WEP or WPA) which has been chosen during the program code writing phase, and which implements a protocol (e.g., the protocol known as Diffie Hellman, see for example Bruce Schneier "Applied Cryptography, Second Edition", 1996, John Wiley & Sons, Inc., Chapter 22) which allows a secret to be agreed with another entity, without any need for the secret to be shared in advance (block 300);
- the guided procedure asks the user to start the enrollment for the new UT by pressing a registration button RB (FIG. 1) on the AP (block 310);
- the user presses the RB on the AP (block 320);
- the AP control software configures the AP so as to allow access to the WLAN also to the UTs in possession of the authentication key/password Kw1 (block 330). Specifically, when the user presses the RB, the AP control software adds the authentication key/password Kw1 to a list of authenticated keys/passwords used by the AP for identifying the UTs having access to the WLAN;
- the guided procedure asks the user to confirm prosecution, for example by clicking on a soft-button, and upon detecting the confirmation, the guided procedure configures the new UT to perform the authentication with the WLAN by using the authentication key/password Kw1 for the WLAN (block 340). The way these operations are performed depends on the hardware and software architecture of the UT, but it is well known to the skilled persons and will not therefore described hereinafter. In a possible embodiment, the authentication key/password Kw1 may be supported by the operating system of the UT and the configuration procedure may exploit some Application Program Interfaces (APIs) of the operating system, to configure the authentication key/password Kw1;
- the new UT connects to the AP (block 350);
- the new UT agrees with the AP on a symmetric encryption key/password KS by using the above-mentioned protocol (Diffie Hellman) which allows a secret to be agreed with another entity, without any need for the secret to be shared in advance (block 360). Specifically, a communication channel is established between the new UT and the AP and the agreed key/password KS is used to encrypt any communication over said channel. To agree on the symmetric key/password KS and to encrypt the communications it is possible to use for example the TLS protocol at the application level, like in https, with Diffie Hellman as key/password agreement method, e.g. using the cipher suite TLS_DH_anon_WITH_3DES_EDE_CBC_SHA as specified by RFC2246 of (the text of the latter which can be downloaded, as of the filing date of the present specification, from the Internet at the IETF website from a file entitled "rfc2716.txt".
- the guided procedure sends to the AP a request for an enrollment key/password Kw2, which is needed by the latter to subsequently gain access to the WLAN (block 370);
- the guided procedure asks the user to confirm the AP that an enrollment key/password Kw2 is to be generated by pressing the RB on the AP (block 380);
- the user presses the RB on the AP (block 390);
- the AP generates a random enrollment key/password Kw2, associates the enrollment key/password Kw2 with an identifier ID of the UT (e.g., the MAC address of the UT), and sends the enrollment key/password Kw2 to the UT, along with information relating to the encryption protocol to be used to communicate with the WLAN (e.g., specifying if the key is a WEP, a Temporal Key Integrity Protocol (TKIP), or an Advanced Encryption Standard (AES) key) (block 400);
- the AP closes the enrollment procedure and restores the initial operating mode according to which only UTs in possession of an enrollment key/password Kw2 are allowed to gain access to the WLAN (block 410). In particular, the AP replaces the authentication key/password Kw1 with the enrollment key/password Kw2 in the list of the authenticated keys/passwords; and
- upon receiving the enrollment key/password Kw2, the guided procedure stores it and configures the new UT to gain access to the WLAN by using the enrollment key/password Kw2 (block 420).

The previously described enrollment procedure is safe for the following reasons.

Even if the authentication key/password Kw1 is available to anyone, it may be used to gain access to the WLAN only within the limited span of time during which the user has activated the enrollment procedure.

The AP is able to discriminate enrolled UTs from those which connect to it by using the authentication key/password Kw1, and may control the network activity for the latter for example by allowing only data necessary to the issuance of the key/password to be exchanged but not the browsing of the Internet or the connection to network terminals other than the AP.

Theoretically, during the procedure for enrolling a new UT, an hacker having a UT and the authentication key/password Kw2 could gain access to the AP and obtain a key/password which would allow him/her to gain access to the WLAN also after the enrollment procedure has been completed.

In order to minimize this risk the following precautions can be taken:

- the guided procedure asks the user to press the registration button on the AP to confirm the issuance of the key/password, only if reception of the request for the key/password has been acknowledged by the AP. The acknowledgment may be based on network protocols with acknowledgment, such as Transmission Control Protocol (TCP) or on a specific protocol (for example the http).

upon pressing the registration button on the AP, the latter issues the key/password only if a single UT is connected by using the authentication key/password Kw1, and if the AP has received only a single request for a new key/password;

in every moment the user may verify, through the AP configuration interface the number of issued keys/passwords and the UT identifier ID of the UT (e.g., the MAC address) associated with each one of them. If the user does not recognize an identifier ID, he may disable the UT to have access to the WLAN.

To prevent attacks of the type "man in the middle" during the key/password issuance phase, it is possible to provide the APs with a digital certificate issued by a CA under the control of the manufacturer of the AP. Such digital certificate may be verified by the enrollment procedure running on the UT, provided that it has the digital certificate of the CA.

Finally, various modifications to the embodiments will be readily apparent to those skilled in the art, and the generic principles herein may be applied to other embodiments and applications without departing from the spirit and scope of the present invention, as defined by the appended claims.

For example, the procedure for enrolling a new UT may be run through the AP graphic configuration interface, rather than by a registration button on the AP (for example by accessing the AP graphic configuration interface through an AP safe network port such as the Ethernet port. In this case safety of the enrollment procedure is guaranteed by the fact that only UTs which exploit a cable interface (i.e., UTs controlled by the user) may gain access to the AP graphic configuration interface when the AP is not performing any enrollment procedure.

Moreover, the enrollment procedure of the present invention may also be applied to networks different than IEEE 802.11 WLANS, wherein connection to UTs occurs subject to EAP/TLS authentication protocol (e.g., an Ethernet LAN). In this case, the functions of the AP and CA are performed by the first network apparatus to which the UTs connect (e.g., a switch in an Ethernet LAN having a registration button).

In a further aspect of the present invention, access to the WLAN during the enrollment procedure may be provided to new UTs without using the EAP/TLS authentication protocol and a DC issued by CA2, on condition that EAP/TLS authentication protocol is used during normal operation. For example, during the enrollment procedure the WLAN may configure in an "open" mode, without either authentication or encryption, or the connection between the AP and the UT to be enrolled may be made safer by using a secret key/password which may be pre-set on the AP and printed on the AP package, or displayable and in case modifiable through the AP graphic configuration interface. The key/password may be used in combination with different safety protocols, which for example may be:

WEP

WPA in PSK mode, protocols based on EAP authentication and use of a password (e.g., Protected Extensible Authentication Protocol (PEAP)), any symmetric key encryption protocol (e.g. 3DES) applied at application level (encryption of the requests for new DCs and DC sending), with an in-clear 2-OSI-level to OSI-level WLAN channel.

Additionally, creation of a DC hierarchy such as that shown in FIG. 2 requires that each AP stores a different DC. Alternatively, it is possible to configure each AP in such a way that it automatically generates its own DC at the first start up, thus allowing the AP manufacturer to upload the same software onto all Aps.

Figure 4:
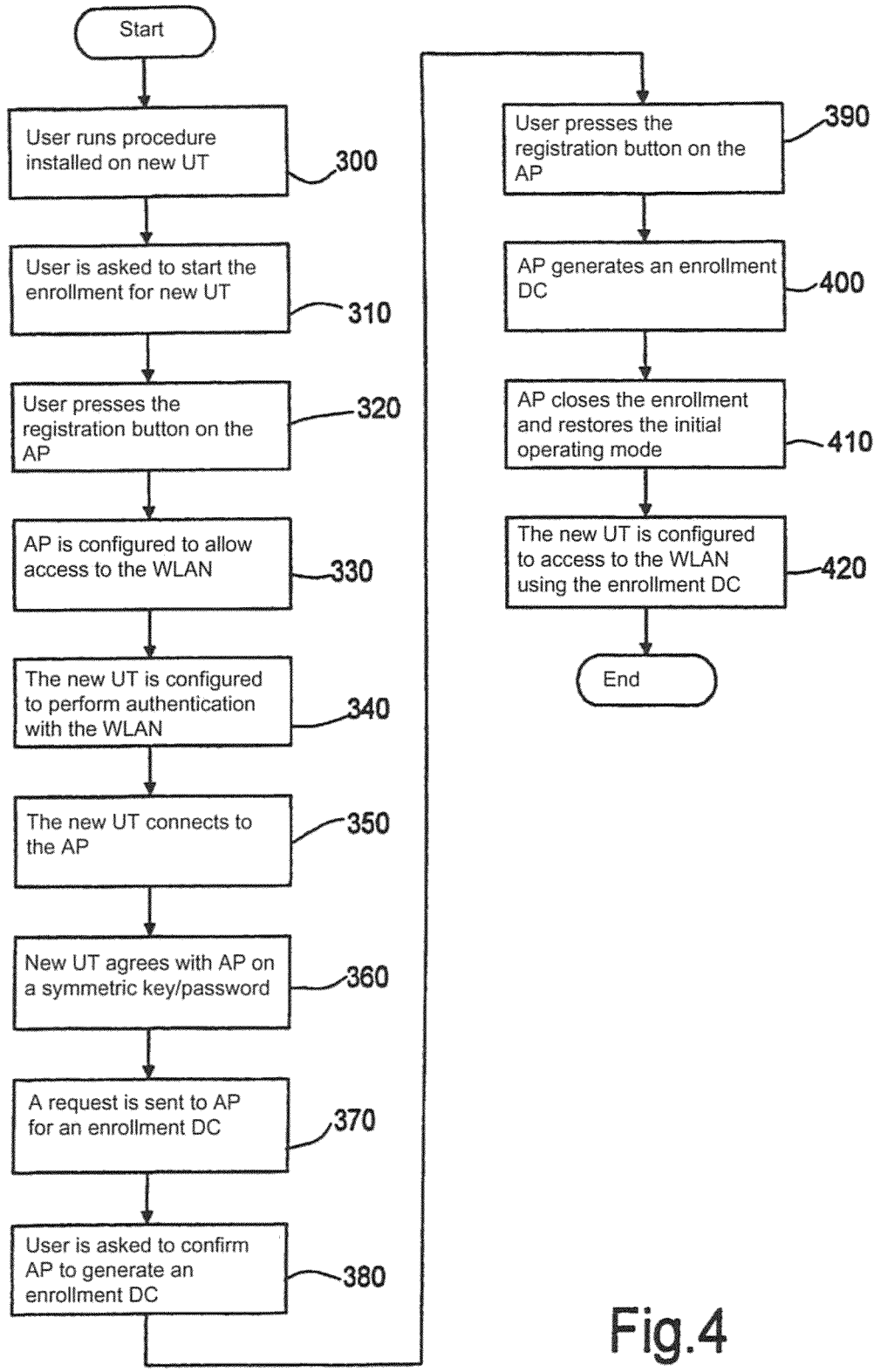
FIG. 4 shows a flow chart of the enrollment method according to a second embodiment of the present invention.

Finally, in the enrollment procedure previously described with reference to the flow-chart in FIG. 4, the secret key/password needed by the UT to subsequently connect to the WLAN, may be randomly generated by the UT rather than the AP, then associated to the MAC address of the UT, and at last sent to the AP, which, when it detects the pressure of the registration button by the user, completes the enrollment procedure by storing the secret key/password and acknowledging completion of the procedure to the UT.

The invention claimed is:

1. A method for enrolling a user terminal in a network comprising an access point for the user terminal, the method comprising:

detecting a performance of a first action by a user which proves that the user may directly interact with the access point;

after detecting the performance of the first action, detecting a reception of a request for enrollment from the user terminal;

after detecting the reception of the request, detecting a performance of a second action by the user which proves that the user may directly interact with the access point; and after detecting the performance of the second action, enrolling the user terminal by generating and sending to the user terminal enrollment access credentials in the network only if a single request for enrollment is received between the detections of the performance of the first and second actions, and refusing the enrollment of the user terminal when more than a single request for enrollment is received between the detections of the performance of the first and second actions.

2. The method of claim 1, further comprising:

whenever a plurality of requests for enrollment are received from one or more requestors between the detections of the performance of the first and second actions, refusing enrollment to all of the one or more requestors.

3. The method of claim 1, wherein detecting performance of a first action and a second action by the user comprises:

detecting the performance of a first action and a second action by the user physically on the access point.

4. The method of claim 3, wherein detecting performance of a first action and a second action by the user physically on the access point comprises:

detecting a first operation and a second operation of a registration button on the access point.

5. The method of claim 3, wherein detecting performance of a first action and a second action by the user physically on the access point comprises:

detecting a first operation and a second operation of an access point configuration interface on the access point.

6. The method of claim 1, wherein detecting the reception of a request for enrollment from the user terminal comprises:

detecting a reception of a request for the enrollment access credentials.

7. The method of claim 1, wherein the enrollment access credentials comprise an enrollment digital certificate.

8. The method of claim 7, wherein generating and sending the enrollment digital certificate to the user terminal comprises:

detecting the reception of an identifier of either the user or the user terminal and of a public key randomly generated by the user terminal;

upon detecting the performance of the second action by the user, generating the enrollment digital certificate on the basis of the received identifier and the public key;

signing the enrollment digital certificate with a private key of the access point; and sending the signed enrollment digital certificate to the user terminal.

9. The method of claim 1, wherein the enrollment access credentials comprise an enrollment secret key/password.

10. The method of claim 9, wherein generating and sending to the user terminal the enrollment secret key/password comprises:

agreeing to a symmetric key between the user terminal and the access point;

establishing a communication channel between the user terminal and the access point, any communication over said communication channel being encrypted by the agreed symmetric key;

detecting the reception of an identifier of either the user or the user terminal, said identifier being sent over the encrypted communication channel; and upon detecting the performance of the second action by the user, randomly generating the enrollment secret key/password;

associating the enrollment secret key/password with the received identifier; and sending the enrollment secret key/password to the user terminal via the encrypted communication channel.

11. The method of claim 1, wherein enrolling the user terminal in the network comprises:

upon detecting the performance of the second action by the user, storing the enrollment access credentials.

12. The method of claim 1, further comprising:

implementing an authentication protocol during the communications for the enrollment of the user terminal between the user terminal and the access point.

13. The method of claim 12, wherein implementing an authentication protocol comprises:

upon detecting the performance of the first action by the user, detecting the reception of authentication access credentials from the user terminal;

verifying the authentication access credentials; and in case of positive verification, allowing the user terminal to have temporary access to the access point to perform the enrollment.

14. The method of claim 13, wherein the authentication access credentials comprises an authentication digital certificate.

15. The method of claim 14, wherein the authentication digital certificate is issued by a first certification authority; wherein the access point is provided with a unique access point digital certificate issued by a second certification authority; and wherein the first certification authority is provided with a unique certification authority digital certificate issued by the second certification authority.

16. The method of claim 13, wherein the authentication access credentials comprise an authentication secret key/password.

17. The method of claim 1, wherein the network is a local area network.

18. The method of claim 17, wherein the network is a wireless local area network.

19. The method of claim 18, wherein the wireless local area network is adapted for use in a domestic environment.

20. The method of claim 18, wherein the wireless local area network is adapted for use in a small office or home office environment.

21. An access point for a network comprising at least one processor to implement the enrolling method according to claim 1.

22. A network, comprising the access point of claim 21.

23. The network of claim 22, comprising a local area network.

24. The network of claim 23, comprising a wireless local area network.

25. The network of claim 23, wherein the network is adapted for use in a domestic environment.

26. The network of claim 23, wherein the network is adapted for use in a small office or home office.

27. A user terminal comprising at least one processor to connect to, and to cooperate with an access point to implement the enrolling method according to claim 1.

28. At least one non-transitory computer readable medium storing software modules capable, when loaded in a user terminal and in an access point for a network, of cooperating in implementing the method according to claim 1.

29. A method for enrolling a user terminal in a network comprising an access point for the user terminal, the method comprising:

detecting a performance of a first action by a user which proves that the user may directly interact with the access point;

detecting a reception of a request for enrollment from the user terminal, wherein the request for enrollment comprises an authentication digital certificate issued by a first certification authority, wherein the first certification authority is provided with a unique certification digital certificate that is issued by a second certification authority and inserts the unique digital certificate in the authentication digital certificate, and wherein the access point is provided with a unique access point digital certificate issued by a third certification authority;

detecting a performance of a second action by the user which proves that the user may directly interact with the access point;

verifying, by comparing the unique certification digital certificate and the unique access point digital certificate, that the second certification authority is the same as the third certification authority; and when it is verified that the second certification authority is the same as the third certification authority and upon detecting the performance of the second action by the user, enrolling the user terminal by generating and sending to the user terminal enrollment access credentials in the network only when a single request for enrollment is received between the detections of the performance of the first and second actions.

* * * * *